(12) United States Patent
Nakano

(10) Patent No.: US 11,694,467 B2
(45) Date of Patent: Jul. 4, 2023

(54) DETECTING DEVICE AND DETECTION SYSTEM

(71) Applicant: Japan Display Inc., Tokyo (JP)

(72) Inventor: Fumihoru Nakano, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/725,781

(22) Filed: Apr. 21, 2022

(65) Prior Publication Data

US 2022/0358780 A1  Nov. 10, 2022

(30) Foreign Application Priority Data

Apr. 28, 2021  (JP) ................................. 2021-076582

(51) Int. Cl.
    *G06V 40/13*  (2022.01)
(52) U.S. Cl.
    CPC ................................ *G06V 40/1306* (2022.01)
(58) Field of Classification Search
    None
    See application file for complete search history.

(56) References Cited

U.S. PATENT DOCUMENTS

| | | | |
|---|---|---|---|
| 7,084,645 B1 | 8/2006 | Umeda et al. | |
| 2013/0127779 A1* | 5/2013 | Lillie | G06F 3/04166 345/173 |
| 2015/0205433 A1* | 7/2015 | Mizuhashi | G06F 3/04184 345/174 |
| 2017/0010717 A1* | 1/2017 | Kim | G06F 3/0446 |
| 2019/0102020 A1* | 4/2019 | Suzuki | G06F 3/0412 |
| 2019/0102038 A1* | 4/2019 | Uehara | G06F 3/0446 |

FOREIGN PATENT DOCUMENTS

JP  2005-152223 A  6/2005

* cited by examiner

*Primary Examiner* — Benjamin X Casarez
(74) *Attorney, Agent, or Firm* — K&L Gates LLP

(57) ABSTRACT

A detecting device includes a plurality of first electrodes extending in a first direction and a plurality of second electrodes extending in a second direction intersecting the first direction, the first electrodes and the second electrodes being disposed facing each other with an insulating layer interposed therebetween, a first electrode selection circuit configured to supply a first drive signal or a second drive signal with a lower potential than that of the first drive signal to the first electrodes according to a supplied signal of a first code or a second code, and a detection circuit configured to detect capacitance generated between the first electrodes and the second electrodes due to the drive signal.

11 Claims, 9 Drawing Sheets

|     | t1   | t2   | t3   | t4   | t5   | t6   | t7   | t8   |
|-----|------|------|------|------|------|------|------|------|
|     | CDM1 | CDM2 | CDM3 | CDM4 | CDM5 | CDM6 | CDM7 | CDM8 |
| Tx1 | 1 | 1 | 1 | 1 | 1 | 1 | 1 | 1 |
| Tx2 | 1 | 0 | 1 | 0 | 1 | 0 | 1 | 0 |
| Tx3 | 1 | 1 | 0 | 0 | 1 | 1 | 0 | 0 |
| Tx4 | 1 | 0 | 0 | 1 | 1 | 0 | 0 | 1 |
| Tx5 | 1 | 1 | 1 | 1 | 0 | 0 | 0 | 0 |
| Tx6 | 1 | 0 | 1 | 0 | 0 | 1 | 0 | 1 |
| Tx7 | 1 | 1 | 0 | 0 | 0 | 0 | 1 | 1 |
| Tx8 | 1 | 0 | 0 | 1 | 0 | 1 | 1 | 0 |

FIG.5

(FINGERPRINT PATTERN) =

$$\begin{pmatrix} 1 & 1 & 1 & 1 & 1 & 1 & 1 & 1 \\ 1 & -1 & -1 & -1 & -1 & -1 & -1 & 1 \\ 1 & -1 & 1 & 1 & 1 & 1 & -1 & 1 \\ 1 & -1 & 1 & -1 & -1 & 1 & -1 & 1 \\ 1 & -1 & 1 & -1 & -1 & 1 & -1 & 1 \\ 1 & -1 & 1 & 1 & 1 & 1 & -1 & 1 \\ 1 & -1 & -1 & -1 & -1 & -1 & -1 & 1 \\ 1 & 1 & 1 & 1 & 1 & 1 & 1 & 1 \end{pmatrix} \times \begin{pmatrix} D_{11} & D_{12} & D_{13} & D_{14} & D_{15} & D_{16} & D_{17} & D_{18} \\ D_{21} & D_{22} & D_{23} & D_{24} & D_{25} & D_{26} & D_{27} & D_{28} \\ D_{31} & D_{32} & D_{33} & D_{34} & D_{35} & D_{36} & D_{37} & D_{38} \\ D_{41} & D_{42} & D_{43} & D_{44} & D_{45} & D_{46} & D_{47} & D_{48} \\ D_{51} & D_{52} & D_{53} & D_{54} & D_{55} & D_{56} & D_{57} & D_{58} \\ D_{61} & D_{62} & D_{63} & D_{64} & D_{65} & D_{66} & D_{67} & D_{68} \\ D_{71} & D_{72} & D_{73} & D_{74} & D_{75} & D_{76} & D_{77} & D_{78} \\ D_{81} & D_{82} & D_{83} & D_{84} & D_{85} & D_{86} & D_{87} & D_{88} \end{pmatrix}$$

DETECTING DEVICE AND DETECTION SYSTEM

CROSS-REFERENCE TO RELATED APPLICATION

This application claims the benefit of priority from Japanese Patent Application No. 2021-076582 filed on Apr. 28, 2021, the entire contents of which are incorporated herein by reference.

BACKGROUND

1. Technical Field

The present invention relates to a detecting device and a detection system.

2. Description of the Related Art

There have recently been demands for detecting a fingerprint used for personal authentication, for example, by a capacitive system. In detecting a fingerprint, electrodes with a smaller area are used than in detecting contact of a hand or a finger. To obtain signals from small electrodes, code division multiplexing drive that provides excellent detection sensitivity is employed. Code division multiplexing drive is a drive system that simultaneously selects a plurality of drive electrodes and supplies drive signals the phases of which are determined based on a predetermined code, to the selected drive electrodes (refer to Japanese Patent Application Laid-open Publication No. 2005-152223 (JP-A-2005-152223)). In the fingerprint sensor described in JP-A-2005-152223, a code generator generates a code corresponding to a plurality of column wires, and a column wiring driver divides the column wires into a first wiring group and a second wiring group based on the code and drives each of the groups.

In the technology described in JP-A-2005-152223, the capacitance value of capacitive elements formed between drive electrodes and detection electrodes changes depending on the number of simultaneously selected drive electrodes. Specifically, as the number of simultaneously selected drive electrodes increases, the capacitance value of the capacitive elements formed between the drive electrodes and the detection electrodes increases. Therefore, if the number of simultaneously selected drive electrodes is large, detection signals output from the detection electrodes may possibly be clipped. If the gain is designed to match with a state where the number of simultaneously selected drive electrodes is relatively large, the detection signals output from the detection electrodes may possibly be made small when the number of simultaneously selected drive electrodes is relatively small, thereby reducing the detection accuracy.

An object of the present invention is to provide a detecting device and a detection system that can suppress clipping of detection signals and achieve excellent fingerprint detection.

SUMMARY

A detecting device according to an embodiment of the present disclosure includes a plurality of first electrodes extending in a first direction and a plurality of second electrodes extending in a second direction intersecting the first direction, the first electrodes and the second electrodes being disposed facing each other with an insulating layer interposed therebetween, a first electrode selection circuit configured to supply a first drive signal or a second drive signal with a lower potential than that of the first drive signal to the first electrodes according to a supplied signal of a first code or a second code, and a detection circuit configured to detect capacitance generated between the first electrodes and the second electrodes due to the drive signal. The first electrode selection circuit has a first period when the first code is assigned to all the first electrodes included in one detection unit and a second period when the first code is assigned to some of the first electrodes included in the detection unit out of the first electrodes, the first electrode selection circuit supplies the first drive signal to the first electrodes to which the first code is assigned in the second period, and the first electrode selection circuit supplies the second drive signal to all the first electrodes in the first period.

A detection system according to an embodiment of the present disclosure includes a detecting device including a plurality of first electrodes extending in a first direction and a plurality of second electrodes extending in a second direction intersecting the first direction, the first electrodes and the second electrodes being disposed facing each other with an insulating layer interposed therebetween, a first electrode selection circuit configured to supply a first drive signal or a second drive signal with a lower potential than that of the first drive signal to the first electrodes according to a supplied signal of a first code or a second code, and a detection circuit configured to detect capacitance generated between the first electrodes and the second electrodes due to the drive signal, and a fingerprint pattern generating device configured to generate a fingerprint pattern based on an output from the detecting device. The first electrode selection circuit has a first period when the first code is assigned to all the first electrodes included in one detection unit and a second period when the first code is assigned to some of the first electrodes included in the detection unit out of the first electrodes, the first electrode selection circuit supplies the first drive signal to the first electrodes to which the first code is assigned in the second period, and the first electrode selection circuit supplies the second drive signal to all the first electrodes in the first period.

BRIEF DESCRIPTION OF THE DRAWINGS

FIG. 5 is a conceptual diagram of a specific example of fingerprint pattern generation according to the embodiment;

DETAILED DESCRIPTION

Figure 1:
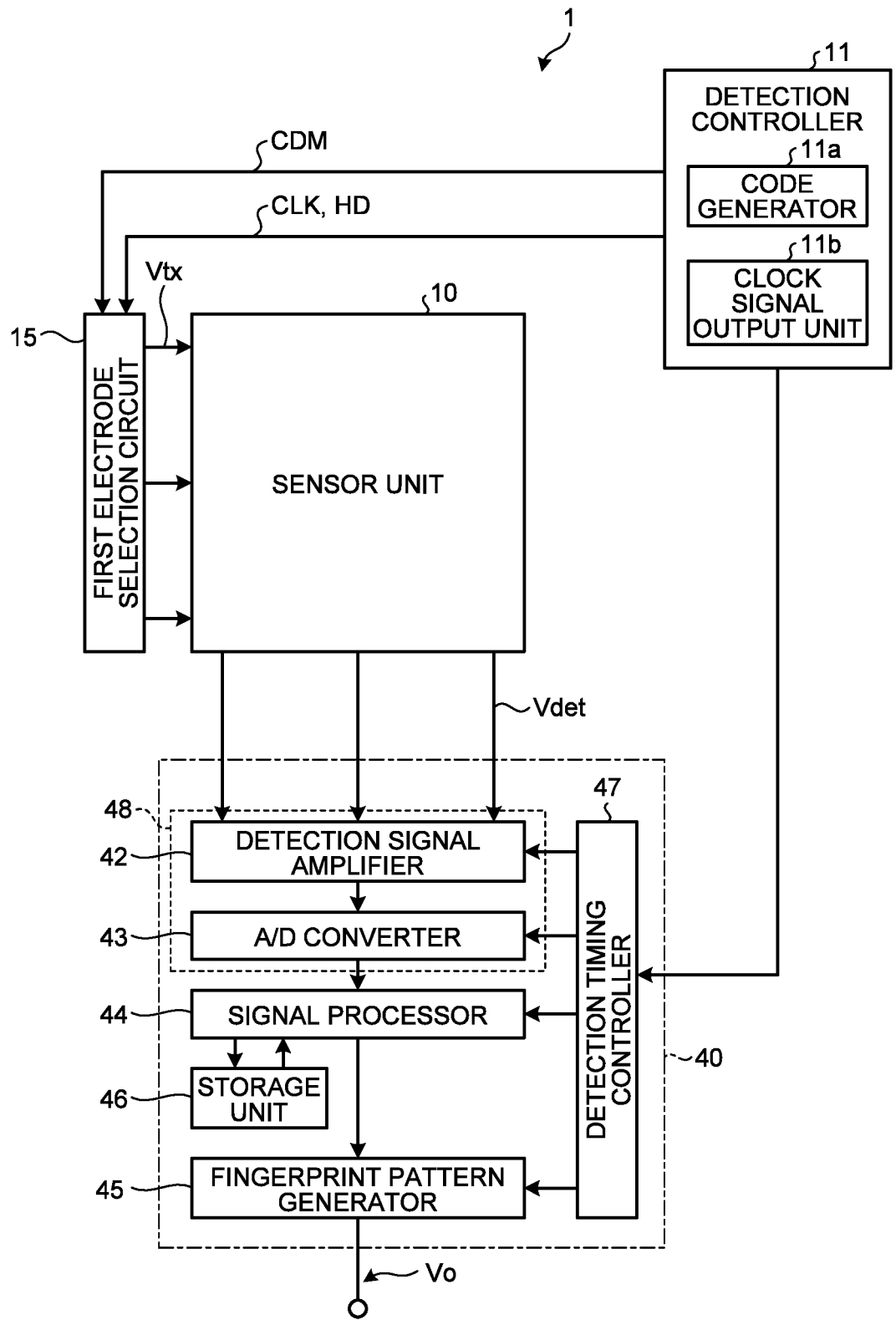
FIG. 1 is a block diagram of an example of the configuration of a detecting device according to an embodiment.

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below may be appropriately combined. What is disclosed herein is given by way of example only, and appropriate modifications made without departing from the spirit of the present invention and easily conceivable by those skilled in the art naturally fall within the scope of the present invention. To simplify the explanation, the drawings may possibly illustrate the width, the thickness, the shape, and other elements of each unit more schematically than those in the actual aspect. These elements, however, are given by way of example only and are not intended to limit interpretation of the present invention. In the present specification and the drawings, components similar to those previously described with reference to previous drawings are denoted by like reference numerals, and detailed explanation thereof may be appropriately omitted.

FIG. 1 is a block diagram of an example of the configuration of a detecting device according to an embodiment. As illustrated in FIG. 1, a detecting device 1 according to the embodiment includes a sensor unit 10, a detection controller 11, a first electrode selection circuit 15, and a detector 40.

Figure 2:
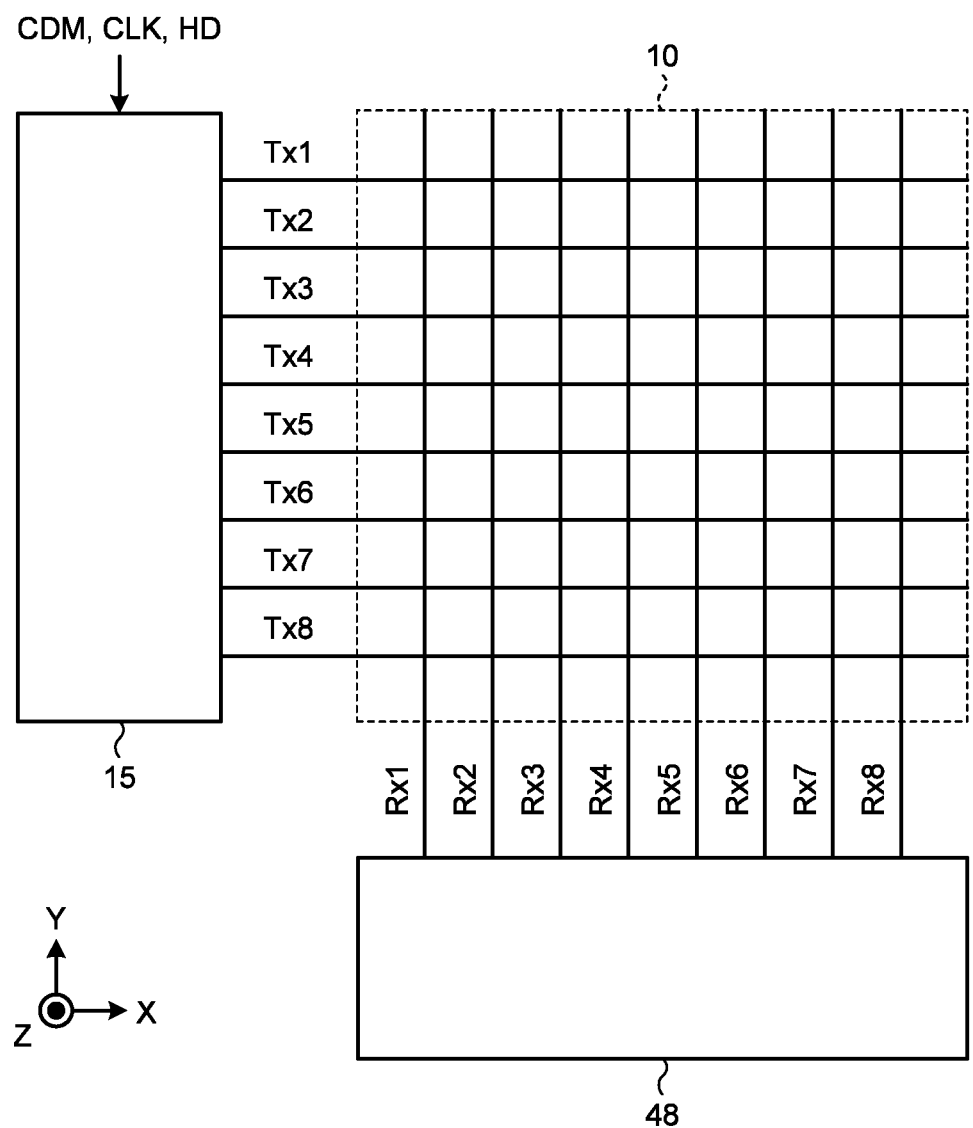
FIG. 2 is a schematic of the configuration of a sensor unit and a method for detecting a fingerprint pattern by the sensor unit.

FIG. 2 is a schematic of the configuration of the sensor unit and a method for detecting a fingerprint pattern by the sensor unit. The sensor unit 10 includes a plurality of first electrodes Tx and a plurality of second electrodes Rx. The first electrodes Tx extend in an X-direction and are arrayed in a Y-direction. The second electrodes Rx extend in the Y-direction and are arrayed in the X-direction. The first electrodes Tx and the second electrodes Rx face each other in a Z-direction in a non-contact state. The first electrodes Tx are coupled to the first electrode selection circuit 15. The second electrodes Rx are coupled to the detector 40.

While FIG. 2 illustrates an example where eight first electrodes Tx (Tx1, Tx2, . . . , and Tx8) and eight second electrodes Rx (Rx1, Rx2, . . . , and Rx8) are provided, the embodiment is not limited thereto. The number of first electrodes Tx and the number of second electrodes Rx can be an integer of 2 or larger and may be a multiple of 8, such as 64 and 128. The embodiment, for example, may have a plurality of regions each including a plurality of (eight in the example illustrated in FIG. 2) first electrodes Tx (Tx1, Tx2, . . . , and Tx8) and a plurality of (eight in the example illustrated in FIG. 2) second electrodes Rx (Rx1, Rx2, . . . , and Rx8) as one detection unit.

The sensor unit 10 performs detection based on drive signals Vtx supplied from the first electrode selection circuit 15 by code division multiplexing (CDM) drive.

The detection controller 11 is a circuit that supplies control signals to the first electrode selection circuit 15 and the detector 40 and controls their operations. The detection controller 11 includes a code generator 11a and a clock signal output unit 11b. The code generator 11a supplies the first electrode selection circuit 15 with a predetermined code signal CDM based on a predetermined code defined by the square matrix in the following Expression (1), for example. The order of the square matrix according to the present embodiment is 8 corresponding to the number of first electrodes Tx. The predetermined code is a code based on a square matrix the elements of which are either "1" or "−1" or either "1" or "0" and any two different rows of which are an orthogonal matrix, that is, a code based on a Hadamard matrix, for example. The clock signal output unit 11b supplies clock signals CLK and code switching signals HD to the first electrode selection circuit 15.

$$\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad (1)$$

Figures 3, 4:
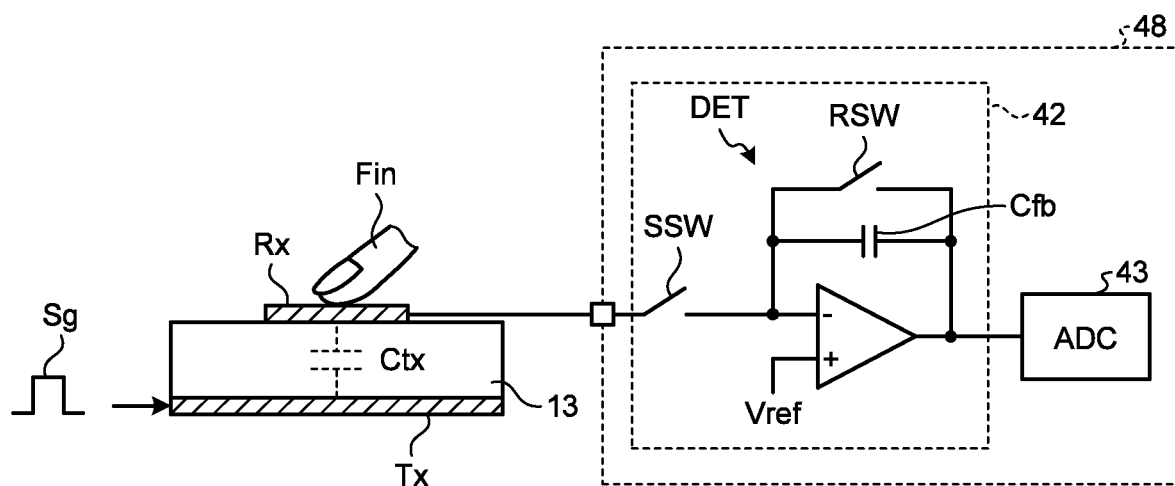
FIG. 3 is a diagram of an example of codes assigned to first electrodes according to code signals.
FIG. 4 is a diagram for explaining detection control by a mutual capacitive system.

The first electrode selection circuit 15 assigns codes according to the code signal CDM to the respective first electrodes Tx based on the code switching signals HD for dividing one frame period into eight periods. FIG. 3 is a diagram of an example of the codes assigned to the first electrodes according to code signals.

Code signals CDM1, CDM2, . . . , and CDM8 are output in periods t1, t2, . . . , and t8, respectively, defined by the code switching signals HD. If the sensor unit 10 has an image display function, image display periods may be arranged between the periods t1, t2, . . . , and t8.

In the period t1 when the code signal CDM1 is output, a code "1" is assigned to all the first electrodes Tx (Tx1, Tx2, . . . , and Tx8) illustrated in FIG. 2. In the following description, the code "1" is also referred to as a "first code". The period t1 when the first code is assigned to all the first electrodes Tx (Tx1, Tx2, . . . , and Tx8) illustrated in FIG. 2 is also referred to as a "first period".

In the period t2 when the code signal CDM2 is output, the first code is assigned to the first electrodes Tx1, Tx3, Tx5, and Tx7, and a code "0" is assigned to the first electrodes Tx2, Tx4, Tx6, and Tx8. In the following description, the code "0" is also referred to as a "second code".

In the period t3 when the code signal CDM3 is output, the first code is assigned to the first electrodes Tx1, Tx2, Tx5, and Tx6, and the second code is assigned to the first electrodes Tx3, Tx4, Tx7, and Tx8.

In the period t4 when the code signal CDM4 is output, the first code is assigned to the first electrodes Tx1, Tx4, Tx5, and Tx8, and the second code is assigned to the first electrodes Tx2, Tx3, Tx6, and Tx7.

In the period t5 when the code signal CDM5 is output, the first code is assigned to the first electrodes Tx1, Tx2, Tx3, and Tx4, and the second code is assigned to the first electrodes Tx5, Tx6, Tx7, and Tx8.

In the period t6 when the code signal CDM6 is output, the first code is assigned to the first electrodes Tx1, Tx3, Tx6, and Tx8, and the second code is assigned to the first electrodes Tx2, Tx4, Tx5, and Tx7.

In the period t7 when the code signal CDM7 is output, the first code is assigned to the first electrodes Tx1, Tx2, Tx7, and Tx8, and the second code is assigned to the first electrodes Tx3, Tx4, Tx5, and Tx6.

In the period t8 when the code signal CDM8 is output, the first code is assigned to the first electrodes Tx1, Tx4, Tx6, and Tx7, and the second code is assigned to the first electrodes Tx2, Tx3, Tx5, and Tx8.

In the following description, the periods t2, t3, . . . , and t8 when the code signals CDM2, CDM3, . . . , and CDM8 are output are also referred to as a "second period".

The first electrode selection circuit 15 according to the present disclosure outputs drive pulses synchronized with the clock signals CLK to the first electrodes Tx to which the first code is assigned in the second period. In the following description, the drive pulse synchronized with the clock signal CLK is also referred to as a "first drive signal". The first electrode selection circuit 15 also outputs drive signals with a lower potential than that of the first drive signal to the first electrodes Tx to which the second code is assigned in the second period. In the following description, the drive signal with a lower potential than that of the first drive signal is also referred to as a "second drive signal".

The detector 40 is a circuit that detects a fingerprint pattern based on the control signals supplied from the detection controller 11 and detection signals Vdet supplied from the sensor unit 10. The detector 40 includes a detection circuit 48, a signal processor 44, a fingerprint pattern generator 45, a storage unit 46, and a detection timing controller 47. The detection circuit 48 includes a detection signal amplifier 42 and an A/D converter 43.

The detection timing controller 47 controls the detection signal amplifier 42, the A/D converter 43, the signal processor 44, and the fingerprint pattern generator 45 such that they operate synchronously with one another based on the control signals supplied from the detection controller 11.

The sensor unit 10 supplies the detection signals Vdet to the detection circuit 48.

The detection signal amplifier 42 outputs signals obtained by amplifying the detection signals Vdet supplied from the sensor unit 10. The A/D converter 43 converts analog signals output from the detection signal amplifier 42 into digital signals.

The signal processor 44 performs predetermined decoding on the signals converted into digital signals.

The storage unit 46 temporarily stores therein data resulting from the decoding. The storage unit 46 may be a random-access memory (RAM), a read-only memory (ROM), or a register circuit, for example.

The fingerprint pattern generator 45 generates a fingerprint pattern based on the data resulting from the decoding and temporarily stored in the storage unit 46 and outputs the obtained fingerprint pattern as sensor output Vo.

The detecting device 1 performs capacitive detection control. The following describes detection control by a mutual capacitive system in the detecting device 1 according to the embodiment with reference to FIG. 4. FIG. 4 is a diagram for explaining detection control by the mutual capacitive system. FIG. 4 also illustrates the detection circuit 48. The detection circuit 48 includes a voltage detector DET for each of the second electrodes Rx. The voltage detector DET is provided to the detection signal amplifier 42. In other words, the detection signal amplifier 42 includes a plurality of voltage detectors DET corresponding to the respective second electrodes Rx.

As illustrated in FIG. 4, capacitance Ctx is formed by a pair of electrodes, that is, the first electrode Tx and the second electrode Rx, disposed facing each other with an insulating layer 13 interposed therebetween. The capacitance Ctx generates not only an electric field formed between the facing surfaces of the first electrode Tx and the second electrode Rx but also a fringe electric field extending from the ends of the first electrode Tx to the upper surface of the second electrode Rx. The insulating layer 13 can be composed of a single insulating film. Alternatively, the insulating layer 13 may be composed of a stack including a plurality of insulating films or a stack including a dielectric, an air layer, or a resin or glass substrate that supports the second electrode Rx, for example, in addition to these insulating films.

The first drive signal supplied to the first electrode Tx is an AC square wave Sg at a predetermined frequency (e.g., a frequency of the order of several kilohertz to several hundred kilohertz), for example. An electric current corresponding to the capacitance Ctx flows through the voltage detector DET. The voltage detector DET converts fluctuations in electric current due to the AC square wave Sg into fluctuations in voltage.

The amplitude of a voltage signal output from the voltage detector DET becomes smaller as a finger Fin comes closer to the detection surface. The absolute value |ΔV| of the difference in voltage changes depending on the effects of an object to be detected in contact with or in proximity to the detection surface. The detector 40 determines recesses and protrusions or the like of the finger Fin based on the absolute value |ΔV|. In this manner, the detecting device 1 can perform control for detecting a fingerprint pattern by the mutual capacitive system.

FIG. 5 is a conceptual diagram of a specific example of fingerprint pattern generation according to the embodiment.

In FIG. 5, the square matrix on the left of the left side represents data obtained in each of the periods t1, t2, . . . , and t8 defined by the code switching signals HD. For example, $D_{11}$ represents data obtained by the second electrode Rx1 in the period t1. For example, $D_{88}$ represents data obtained by the second electrode Rx8 in the period t8. In other words, data $D_{11}, D_{12}, \ldots,$ and $D_{18}$ represent a data row obtained by the second electrodes Rx1, Rx2, . . . , and Rx8, respectively, in the period t1, and data $D_{11}, D_{21}, \ldots,$ and $D_{81}$ represent a data column obtained by the second electrode Rx1 in the periods t1, t2, . . . , and t8, respectively. In FIG. 5, the square matrix on the right of the left side is the code based on the Hadamard matrix described above.

Figure 6:
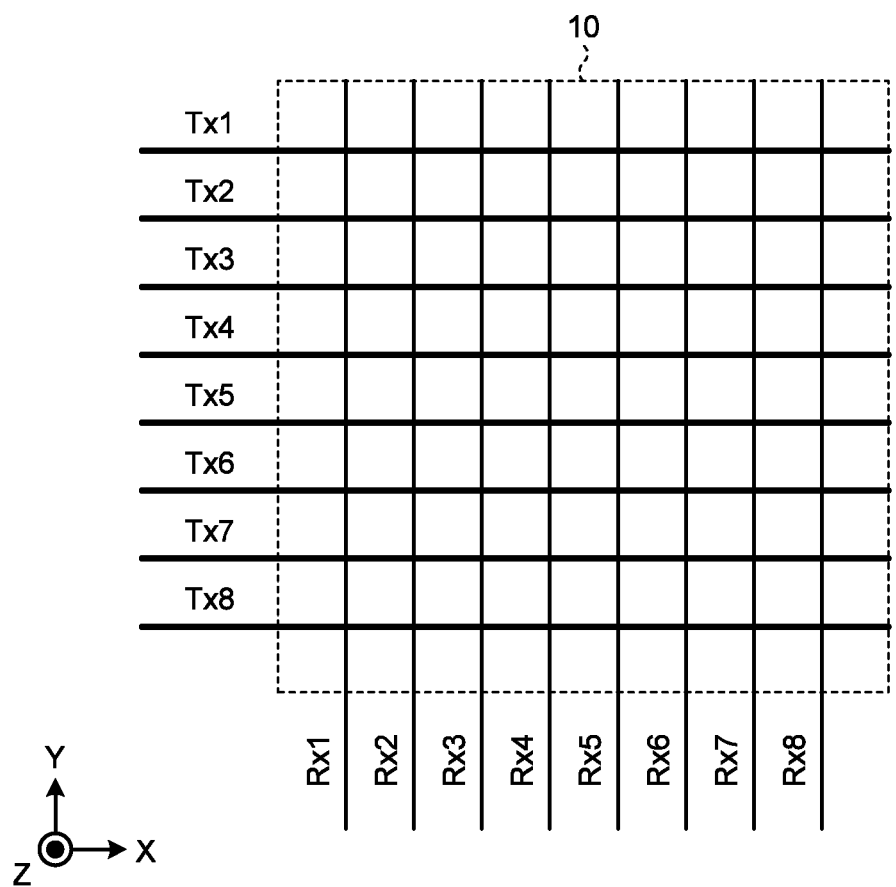
FIG. 6 is a diagram of a state of the first electrodes in a first period.
Figure 7:
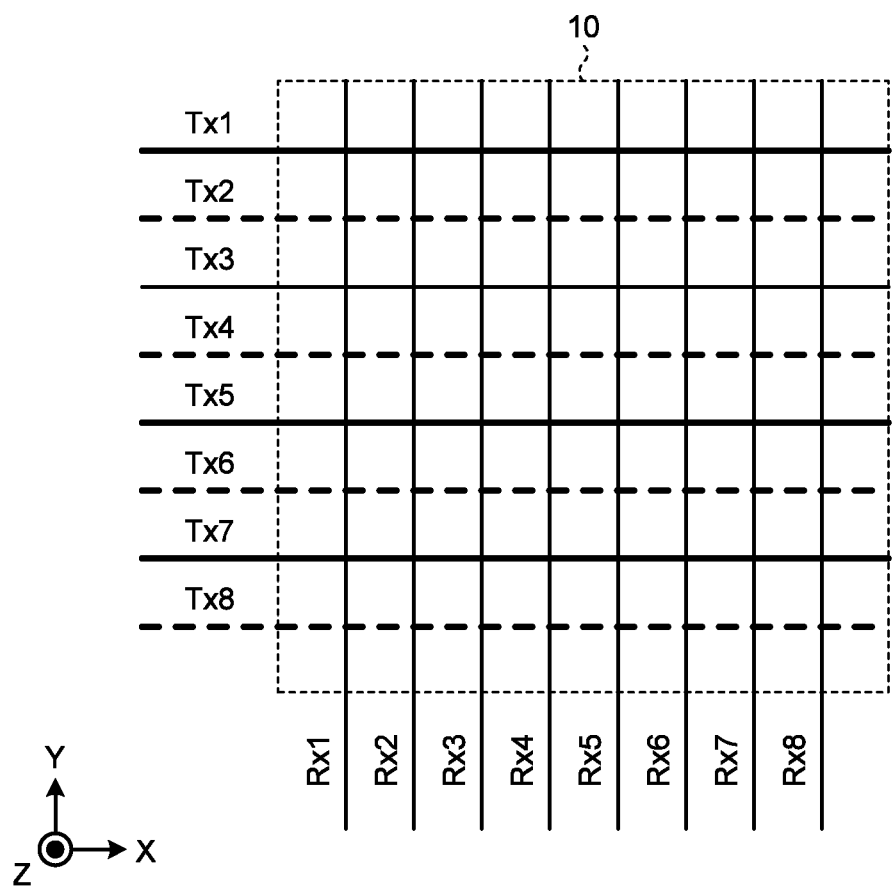
FIG. 7 is a diagram of a state of the first electrodes in a second period.

FIG. 6 is a diagram of a state of the first electrodes in the first period. FIG. 7 is a diagram of a state of the first electrodes in the second period. In the examples illustrated in FIGS. 6 and 7, the first electrodes Tx to which the first code is assigned are represented by solid lines, and the first electrodes Tx to which the second code is assigned are represented by dashed lines. FIG. 7 illustrates a state of the first electrodes Tx in the period t2 as an example of the second period.

In the first period illustrated in FIG. 6, the capacitance Ctx illustrated in FIG. 4 is larger than in the second period illustrated in FIG. 7. As a result, the detection signals Vdet supplied from the second electrodes Rx (Rx1, Rx2, . . . , and Rx8) to the detection circuit 48 in the first period may possibly be clipped. If the gain is reduced to prevent the detection signals Vdet supplied from the second electrodes Rx (Rx1, Rx2, . . . , and Rx8) to the detection circuit 48 in the first period from being clipped, the detection signals Vdet supplied from the second electrode Rx (Rx1, Rx2, . . . , Rx8) to the detection circuit 48 in the second period (t2, t3, . . . , and t8) other than the first period (period t1) may possibly be made small, thereby reducing the detection accuracy.

Figure 8:
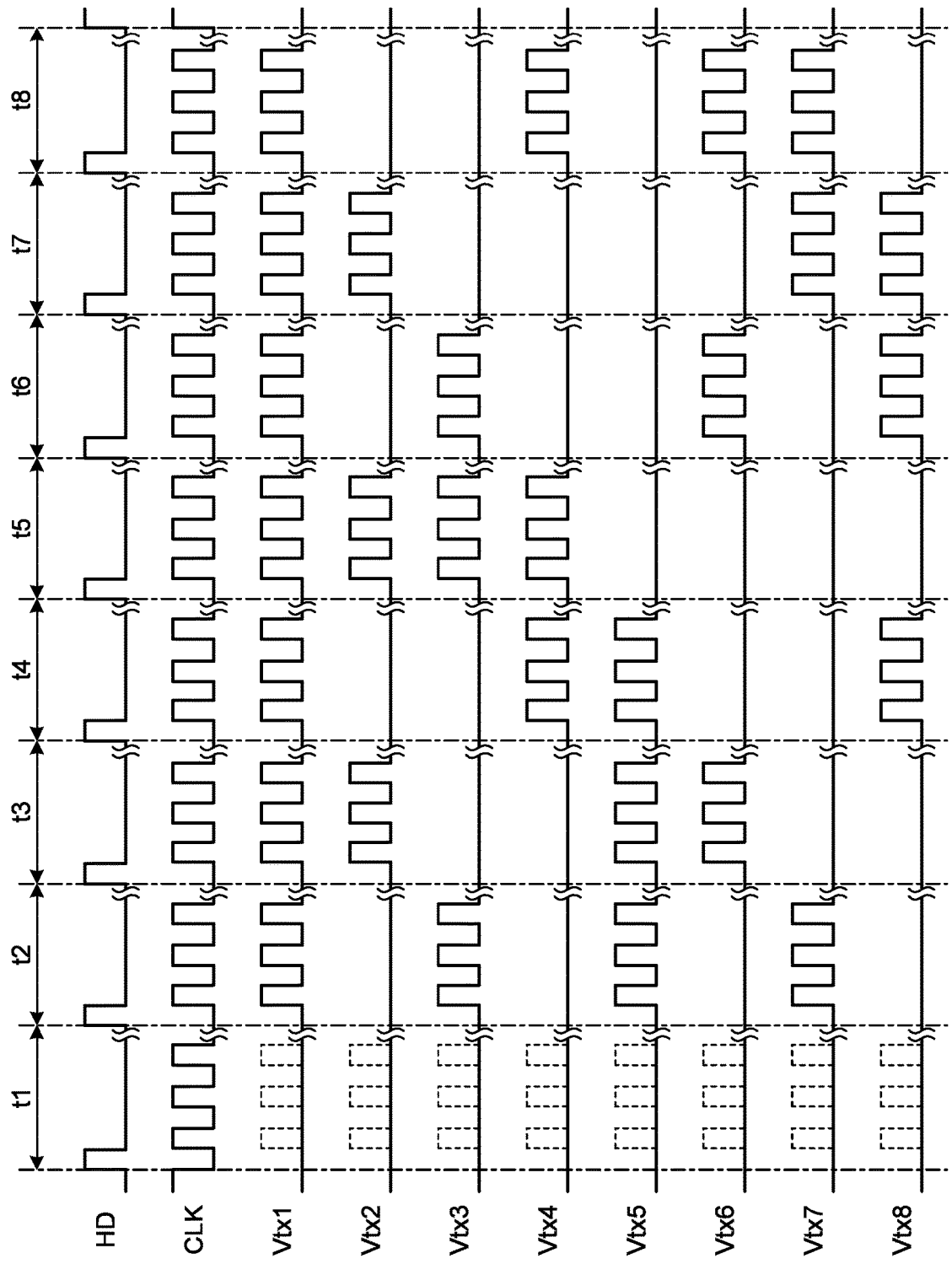
FIG. 8 is a timing chart of drive signals output to the first electrodes according to the embodiment.

FIG. 8 is a timing chart of the drive signals output to the first electrodes according to the embodiment.

As illustrated in FIG. 8, the first electrode selection circuit 15 according to the present disclosure causes all the first electrodes Tx (Tx1, Tx2, . . . , and Tx8) illustrated in FIG. 2 to have a low potential in the period t1, that is, in the first period. The first electrode selection circuit 15 outputs drive pulses synchronized with the clock signals CLK to the first drive electrodes Tx selected according to the code signal CDM in the periods t2, t3, . . . , and t8 other than the period t1 (first period), that is, in the second period. Therefore, the detecting device 1 can make the values of the detection signals Vdet supplied from the second electrodes Rx (Rx1, Rx2, . . . , and Rx8) to the detection circuit 48 approximately 0 in the period t1 (first period). If the sensor unit 10 has an image display function, image display periods may be arranged between the periods as described above.

Figure 9:
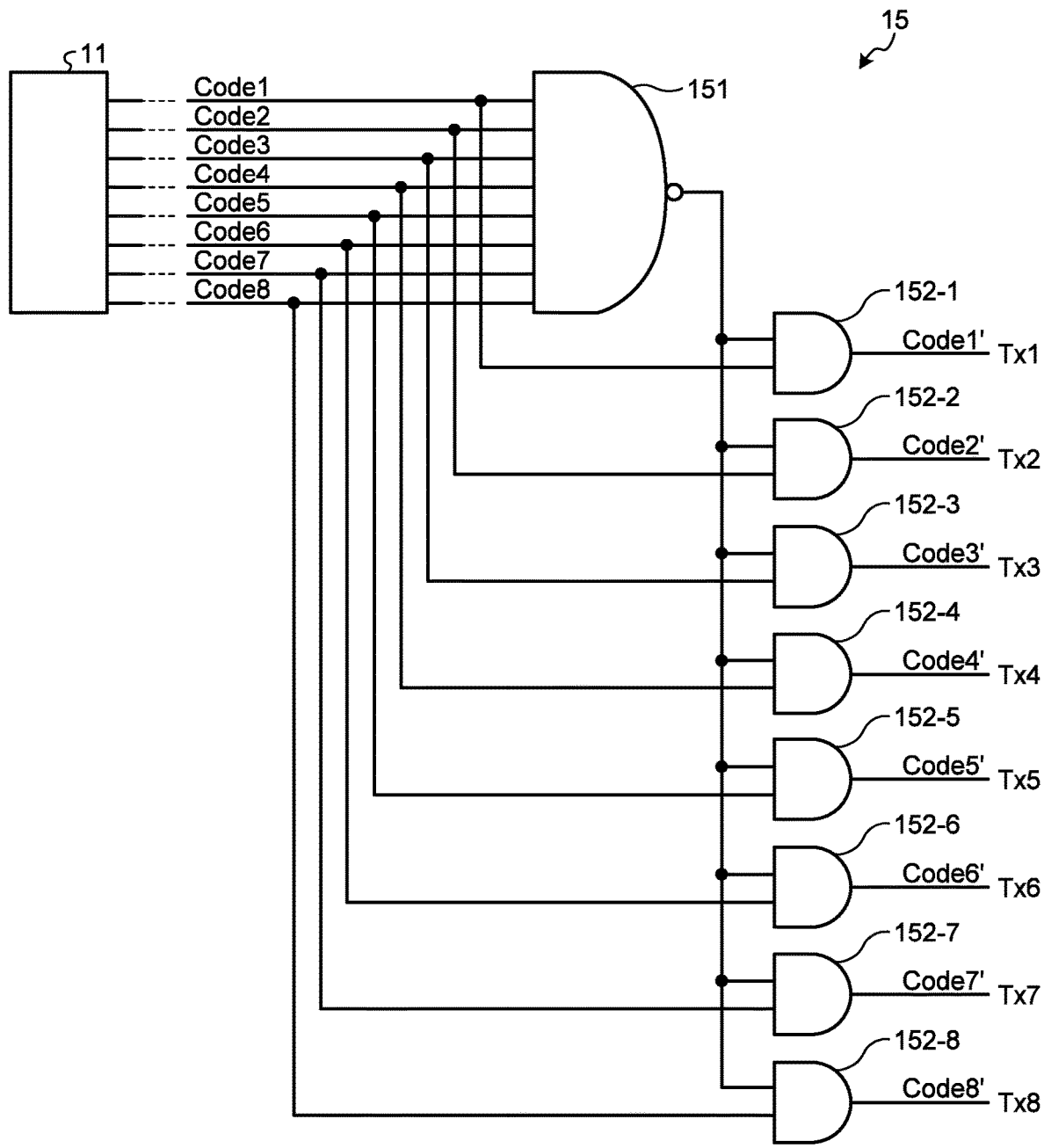
FIG. 9 is a diagram of an example of a logic circuit block of a first electrode selection circuit.

FIG. 9 is a diagram of an example of a logic circuit block of the first electrode selection circuit. As illustrated in FIG. 9, the first electrode selection circuit 15 includes one NAND circuit 151 and a plurality of AND circuits 152-1, 152-2, 152-3, 152-4, 152-5, 152-6, 152-7, and 152-8. In FIG. 9, Code1, for example, represents the code in the code signal CDM corresponding to the first electrode Tx1.

The AND circuits 152-1, 152-2, 152-3, 152-4, 152-5, 152-6, 152-7, and 152-8 are provided for the respective first electrodes Tx. The NAND circuit 151 receives the code signal CDM and calculates NAND of the codes Code1, Code2, Code3, Code4, Code5, Code6, Code7, and Code8 included in the code signal CDM. In other words, the NAND circuit 151 outputs false in the period t1 and true in the other periods t2 to t8.

The AND circuit 152-1 calculates AND of the code Code1 included in the code signal CDM and the output value from the NAND circuit 151. As a result, the AND circuit 152-1 outputs a code Code1' (the second code 0) obtained by inverting the code Code1 (the first code 1 (refer to FIG. 3)) included in the code signal CDM1 input in the period t1 (first period).

The AND circuit 152-2 calculates AND of the code Code2 included in the code signal CDM and the output value from the NAND circuit 151. As a result, the AND circuit 152-2 outputs a code Code2' (the second code 0) obtained by inverting the code Code2 (the first code 1 (refer to FIG. 3)) included in the code signal CDM1 input in the period t1 (first period).

The AND circuit 152-3 calculates AND of the code Code3 included in the code signal CDM and the output value from the NAND circuit 151. As a result, the AND circuit 152-3 outputs a code Code3' obtained by inverting the code Code3 (the first code 1 (refer to FIG. 3)) included in the code signal CDM1 input in the period t1 (first period).

The AND circuit 152-4 calculates AND of the code Code4 included in the code signal CDM and the output value from the NAND circuit 151. As a result, the AND circuit 152-4 outputs a code Code4' (the second code 0) obtained by inverting the code Code4 (the first code 1 (refer to FIG. 3)) included in the code signal CDM1 input in the period t1 (first period).

The AND circuit 152-5 calculates AND of the code Code5 included in the code signal CDM and the output value from the NAND circuit 151. As a result, the AND circuit 152-5 outputs a code Code5' (the second code 0) obtained by inverting the code Code5 (the first code 1 (refer to FIG. 3)) included in the code signal CDM1 input in the period t1 (first period).

The AND circuit 152-6 calculates AND of the code Code6 included in the code signal CDM and the output value from the NAND circuit 151. As a result, the AND circuit 152-6 outputs a code Code6' (the second code 0) obtained by inverting the code Code6 (the first code 1 (refer to FIG. 3)) included in the code signal CDM1 input in the period t1 (first period).

The AND circuit 152-7 calculates AND of the code Code7 included in the code signal CDM and the output value from the NAND circuit 151. As a result, the AND circuit 152-7 outputs a code Code7' (the second code 0) obtained by inverting the code Code7 (the first code 1 (refer to FIG. 3)) included in the code signal CDM1 input in the period t1 (first period).

The AND circuit 152-8 calculates AND of the code Code8 included in the code signal CDM and the output value from the NAND circuit 151. As a result, the AND circuit 152-8 outputs a code Code8' (the second code 0) obtained by inverting the code Code8 (the first code 1 (refer to FIG. 3)) included in the code signal CDM1 input in the period t1 (first period).

The codes Code1, Code2, . . . , and Code8 in the code signals CDM2, CDM3, . . . , and CDM8 input in the periods t2, t3, t4, t5, t6, t7, and t8 (second period) other than the period t1 (first period) are not inverted, and the codes Code1', Code2', . . . , and Code8' are output. The first electrode selection circuit 15 generates drive signals Vtx1, Vtx2, . . . , and Vtx8 to be supplied to the first electrodes Tx1, Tx2, . . . , and Tx8, respectively, based on the output from the logic circuit block illustrated in FIG. 9.

In other words, the first electrode selection circuit 15 outputs the first drive signals to the first electrodes to which the first code is assigned in the periods t2, t3, t4, t5, t6, t7, and t8 (second period) other than the period t1 (first period). The first electrode selection circuit 15 outputs the second drive signals to the first electrodes Tx to which the second code is assigned in the periods t2, t3, t4, t5, t6, t7, and t8 (second period). The first electrode selection circuit 15 according to the present disclosure outputs the second drive signals to all the first electrodes Tx in the first period.

With the operations described above, the detecting device 1 according to the embodiment can cause all the first electrodes Tx (Tx1, Tx2, . . . , and Tx8) illustrated in FIG. 2 to have a low potential and make the values of the detection signals Vdet supplied from the second electrodes Rx (Rx1, Rx2, . . . , and Rx8) to the detection circuit 48 approximately 0 in the period t1 (first period). Consequently, the embodiment can achieve excellent fingerprint detection using the data obtained in the periods t2, t3, t4, t5, t6, t7, and t8 (second period) other than the period t1 (first period).

Figure 10:
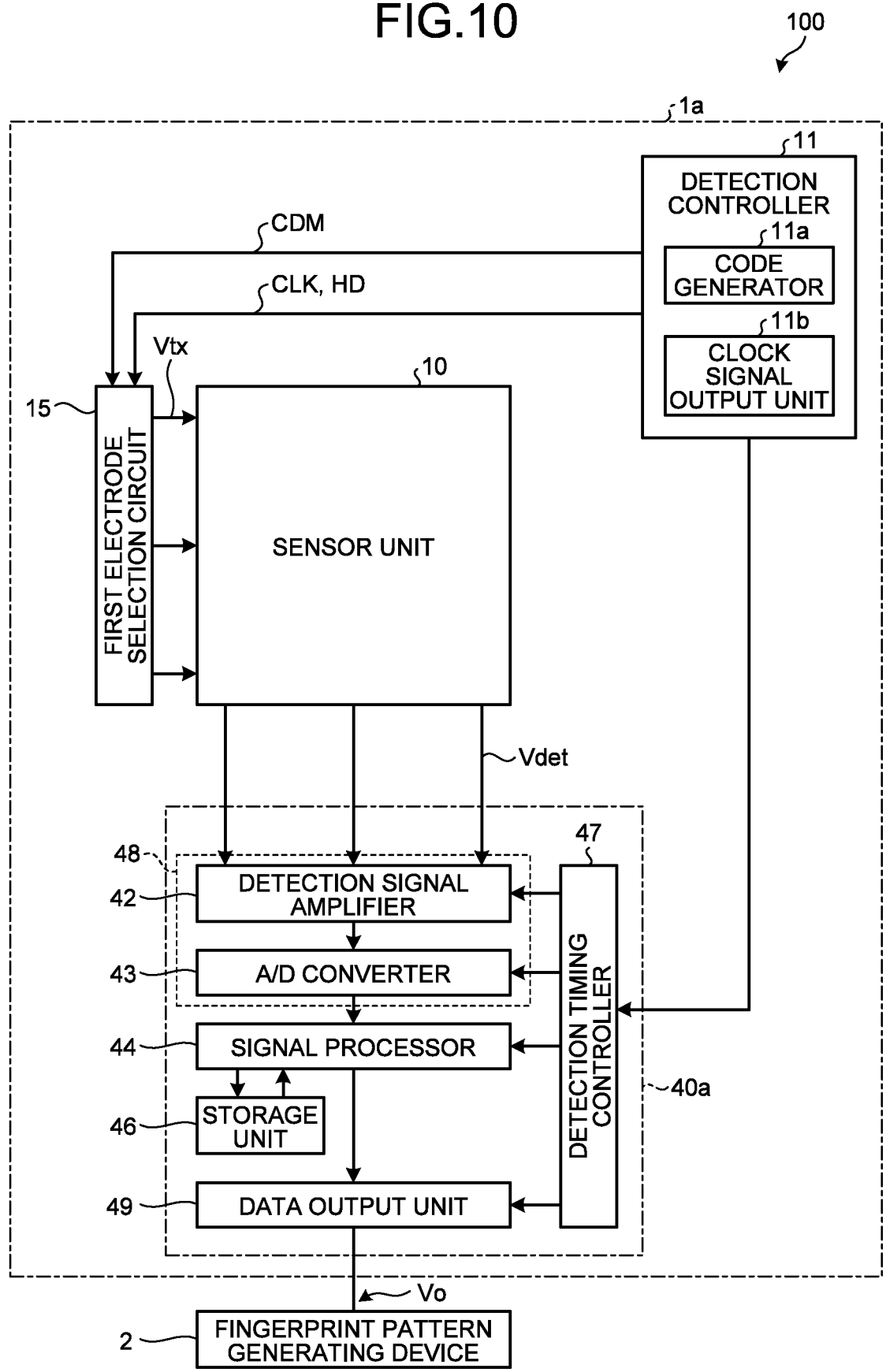
FIG. 10 is a block diagram of an example of the configuration of a detection system according to the embodiment.

FIG. 10 is a block diagram of an example of the configuration of a detection system according to the embodiment. The same components as those of the detecting device 1 illustrated in FIG. 1 are denoted by like reference numerals, and detailed explanation thereof is omitted.

As illustrated in FIG. 10, a detection system 100 according to the embodiment includes a detecting device 1a and a fingerprint pattern generating device 2. The detecting device 1a includes the sensor unit 10, the detection controller 11, the first electrode selection circuit 15, and a detector 40a.

In the detection system 100 illustrated in FIG. 10, a detection timing controller 47a of the detecting device 1a controls the detection signal amplifier 42, the A/D converter 43, the signal processor 44, and a data output unit 49 such that they operate synchronously with one another based on the control signals supplied from the detection controller 11. The data output unit 49 outputs data resulting from decoding and temporarily stored in the storage unit 46 to the fingerprint pattern generating device 2 as the sensor output Vo. The fingerprint pattern generating device 2 generates a fingerprint pattern by the fingerprint pattern generation illustrated in FIG. 5 based on the sensor output Vo output from the detector 40a.

Similarly to the detecting device 1 illustrated in FIG. 1, the detection system 100 according to the embodiment illustrated in FIG. 10 can also cause all the first electrodes Tx (Tx1, Tx2, . . . , and Tx8) illustrated in FIG. 2 to have a low potential, thereby making the values of the detection signals Vdet supplied from the second electrodes Rx (Rx1, Rx2, . . . , and Rx8) to the detection circuit 48 approximately 0 in the period t1 (first period). Consequently, the embodiment can achieve excellent fingerprint detection using the data obtained in the periods t2, t3, t4, t5, t6, t7, and t8 (second period) other than the period t1 (first period).

While exemplary embodiments according to the present invention have been described, the embodiments are not intended to limit the invention. The contents disclosed in the embodiments are given by way of example only, and various modifications may be made without departing from the spirit of the present invention. Appropriate modifications made without departing from the spirit of the present invention naturally fall within the technical scope of the invention. At least one of the various omissions, substitutions, and modifications of the components may be made without departing from the gist of the embodiments above and the modifications thereof.

What is claimed is:

1. A detecting device comprising:
a plurality of first electrodes extending in a first direction and a plurality of second electrodes extending in a second direction intersecting the first direction, the first electrodes and the second electrodes being disposed facing each other with an insulating layer interposed therebetween;
a first electrode selection circuit configured to supply a first drive signal or a second drive signal with a lower potential than that of the first drive signal to the first electrodes according to a supplied signal of a first code or a second code;
a detection circuit configured to detect capacitance generated between the first electrodes and the second electrodes due to the drive signal; and
a detection controller configured to control the first electrode selection circuit and the detection circuit,
wherein
the first electrode selection circuit has a first period when the first code is assigned to all the first electrodes included in one detection unit and a second period when the first code is assigned to some of the first electrodes included in the detection unit out of the first electrodes,
the first electrode selection circuit supplies the first drive signal to the first electrodes to which the first code is assigned in the second period,
the first electrode selection circuit supplies the second drive signal to all the first electrodes in the first period,
the detection controller supplies the first electrode selection circuit with a predetermined code signal based on a predetermined code defined by a square matrix the order of which corresponds to number of the first electrodes in each of the first period and the second period,
the detection circuit detects the capacitance generated between the first electrodes and the second electrodes in each of the first period and the second period based on a control signal supplied from the detection controller,
the first electrode selection circuit comprises:
a NAND circuit configured to receive the code signal; and
a plurality of AND circuits each configured to receive an output value from the NAND circuit and one code corresponding to the first electrode included in the code signal, and
the first electrode selection circuit outputs the first drive signal or the second drive signal based on an output value from the AND circuits.

2. The detecting device according to claim 1, wherein
the detection controller assigns the first code to all the first electrodes included in one detection unit in the first period, and
the detection controller assigns the first code to some of the first electrodes included in one detection unit in the second period.

3. The detecting device according to claim 2, wherein the detection controller assigns the first code to half of all the first electrodes included in one detection unit in the second period.

4. The detecting device according to claim 2, wherein
the first electrode selection circuit supplies the second drive signal to all the first electrodes to which the first code is assigned in the first period, and
the first electrode selection circuit supplies the second drive signal to the first electrodes to which the second code is assigned in the second period.

5. The detecting device according to claim 1, wherein the first period and the second period are alternately arranged.

6. A detection system comprising:
a detecting device comprising:
a plurality of first electrodes extending in a first direction and a plurality of second electrodes extending in a second direction intersecting the first direction, the first electrodes and the second electrodes being disposed facing each other with an insulating layer interposed therebetween;
a first electrode selection circuit configured to supply a first drive signal or a second drive signal with a lower potential than that of the first drive signal to the first electrodes according to a supplied signal of a first code or a second code; and
a detection circuit configured to detect capacitance generated between the first electrodes and the second electrodes due to the drive signal;
a fingerprint pattern generating device configured to generate a fingerprint pattern based on an output from the detecting device; and
a detection controller configured to control the first electrode selection circuit and the detection circuit, wherein
the first electrode selection circuit has a first period when the first code is assigned to all the first electrodes included in one detection unit and a second period when the first code is assigned to some of the first electrodes included in the detection unit out of the first electrodes,
the first electrode selection circuit supplies the first drive signal to the first electrodes to which the first code is assigned in the second period,
the first electrode selection circuit supplies the second drive signal to all the first electrodes in the first period,
the detection controller supplies the first electrode selection circuit with a predetermined code signal based on a predetermined code defined by a square matrix the order of which corresponds to number of the first electrodes in each of the first period and the second period,
the detection circuit detects the capacitance generated between the first electrodes and the second electrodes in each of the first period and the second period based on a control signal supplied from the detection controller, the first electrode selection circuit comprises:
- a NAND circuit configured to receive the code signal; and
- a plurality of AND circuits each configured to receive an output value from the NAND circuit and one code corresponding to the first electrode included in the code signal, and the first electrode selection circuit outputs the first drive signal or the second drive signal based on an output value from the AND circuits.

7. The detection system according to claim 6, wherein
the detection controller assigns the first code to all the first electrodes included in one detection unit in the first period, and
the detection controller assigns the first code to some of the first electrodes included in one detection unit in the second period.

8. The detection system according to claim 7, wherein the detection controller assigns the first code to half of all the first electrodes included in one detection unit in the second period.

9. The detection system according to claim 7, wherein
the first electrode selection circuit supplies the second drive signal to all the first electrodes to which the first code is assigned in the first period, and
the first electrode selection circuit supplies the second drive signal to the first electrodes to which the second code is assigned in the second period.

10. The detection system according to claim 9, wherein the first period and the second period are alternately arranged.

11. The detection system according to claim 6, wherein the first period and the second period are alternately arranged.

* * * * *